(12) United States Patent
Hong et al.

(10) Patent No.: US 11,011,911 B2
(45) Date of Patent: May 18, 2021

(54) MMC CONVERTER AND SUB-MODULES THEREOF

(71) Applicant: HYOSUNG HEAVY INDUSTRIES CORPORATION, Seoul (KR)

(72) Inventors: Jung Won Hong, Bucheon-si (KR); Hong Ju Jung, Seoul (KR); Sung Min Oh, Seoul (KR); Hyun Ho Yoo, Seoul (KR); Joo Yeon Lee, Seoul (KR)

(73) Assignee: HYOSUNG HEAVY INDUSTRIES CORPORATION, Seoul (KR)

( * ) Notice: Subject to any disclaimer, the term of this patent is extended or adjusted under 35 U.S.C. 154(b) by 0 days.

(21) Appl. No.: 16/618,306

(22) PCT Filed: May 28, 2018

(86) PCT No.: PCT/KR2018/006024
§ 371 (c)(1),
(2) Date: Nov. 29, 2019

(87) PCT Pub. No.: WO2018/221907
PCT Pub. Date: Dec. 6, 2018

(65) Prior Publication Data
US 2020/0119559 A1  Apr. 16, 2020

(30) Foreign Application Priority Data
Jun. 2, 2017  (KR) .......................... 10-2017-0069210

(51) Int. Cl.
*H02J 3/36* (2006.01)
*H02M 7/483* (2007.01)

(52) U.S. Cl.
CPC ............... *H02J 3/36* (2013.01); *H02M 7/483* (2013.01); *H02M 2007/4835* (2013.01)

(58) Field of Classification Search
CPC ... H02M 7/483; H02M 2007/4835; H02J 3/36
See application file for complete search history.

(56) References Cited

U.S. PATENT DOCUMENTS 9,065,299 B2   6/2015 Trainer et al.
10,763,761 B2 * 9/2020 Ding .................. H02J 7/345
(Continued)

FOREIGN PATENT DOCUMENTS

CN    105897019 A    8/2016
EP      2564501 A2   3/2013
(Continued)

*Primary Examiner* — Rafael O De Leon Domenech
(74) *Attorney, Agent, or Firm* — Novick, Kim & Lee, PLLC; Jae Youn Kim

(57) ABSTRACT

An MMC converter linked to a HVDC system and a sub-module are proposed. The sub-module includes: first and second power semiconductor switches serially connected in the same direction, each including a semiconductor switch and a diode connected in anti-parallel to the semiconductor switch; a capacitor parallelly connected to the first and second power semiconductor switches serially connected; a first terminal connected to a first node between the first and second power semiconductor switches; a second terminal connected to a second node between the second power semiconductor switch and the capacitor; a third power semiconductor switch of which a side is connected to the second node, the third power semiconductor switch including a semiconductor switch and a diode connected in anti-parallel to the semiconductor switch; and a third terminal connected to a terminal of an AC grid system and connected to the other side of the third power semiconductor switch.

32 Claims, 13 Drawing Sheets

(56) References Cited

U.S. PATENT DOCUMENTS

| | | | |
|---|---|---|---|
| 2015/0333660 A1* | 11/2015 | Kim | H02M 1/32 363/123 |
| 2015/0357906 A1* | 12/2015 | Jung | H02M 1/00 363/56.03 |
| 2016/0094117 A1 | 3/2016 | Hu et al. | |
| 2016/0268915 A1 | 9/2016 | Lin et al. | |
| 2017/0012521 A1* | 1/2017 | Jimichi | H02M 1/32 |
| 2019/0131867 A1* | 5/2019 | Ishii | H02M 7/48 |

FOREIGN PATENT DOCUMENTS

| | | |
|---|---|---|
| JP | 2014-018028 A | 1/2014 |
| WO | 2015-124176 A1 | 8/2015 |

* cited by examiner

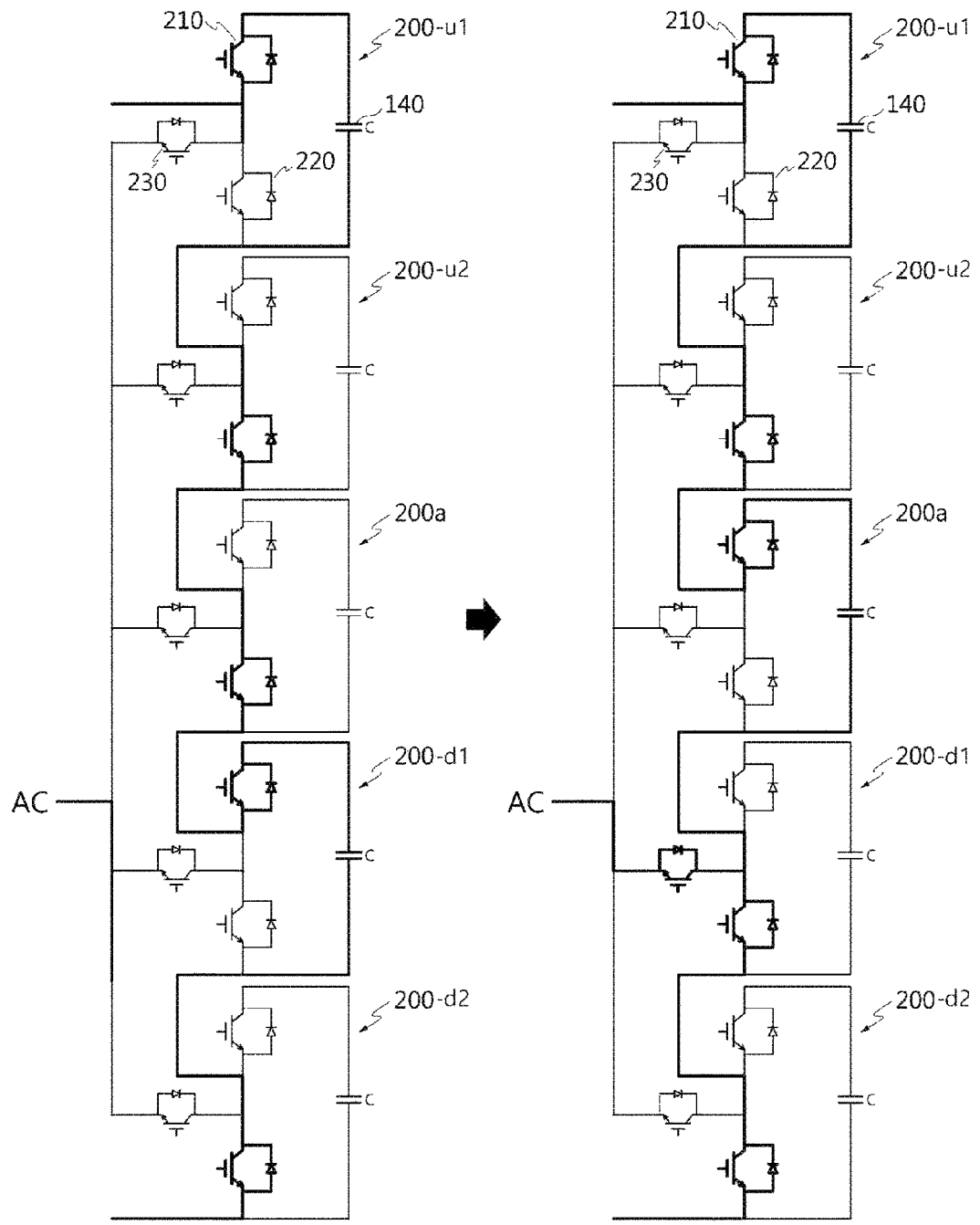
FIG. 7a  FIG. 7b

MMC CONVERTER AND SUB-MODULES THEREOF

TECHNICAL FIELD

The present invention relates to a modular multilevel converter (MMC) and, more particularly, to a MMC converter and a sub-module thereof constituting the same linked to a high voltage direct current (HVDC) system.

BACKGROUND ART

A high voltage direct current (HVDC) system converts AC power produced in power plants into DC power and transmits the power to receiving ends where the power is converted again into AC power to supply to a load. The HVDC system is capable of efficient and economical power transmission through voltage boosting and has advantages such as enabling connection of heterogeneous systems and long-distance, high-efficiency power transmission.

This HVDC system may be linked to the MMC converter. The conventional MMC converter is composed of one or more phase modules 1 as shown in FIG. 1. Each of these phase modules 1 is composed of a plurality of sub-modules 2 connected in series to each other.

The conventional sub-module 2 is configured to be a half-bridge circuit composed of two power semiconductor switches 21 connected in series to each other and a capacitor 22 connected in parallel thereto, as shown in FIG. 2a, or a full-bridge circuit composed of a pair of two power semiconductor switches 21 connected in series to each other and a capacitor 22 connected in parallel thereto as shown in FIG. 2b. Two terminals X1 and X2 are provided in each of the sub-modules 2 so that the upper and lower sub-modules are connected to each other in series through the two terminals X1 and X2.

Each phase module 1 is connected to each of terminals L1, L2, and L3 for connecting to an AC grid system. The upper converter arm 1a and the lower converter arm 1b are distinguished on the basis of each terminal L1, L2 and L3. The second terminal X2 of the lowermost sub-module of the upper converter arm 1a and the first terminal X1 of the uppermost sub-module of the lower converter arm 1b may be connected to any one of the terminals L1, L2, and L3 of the AC grid system. The AC grid system may for example be a three-phase AC power system.

In the conventional MMC converter, a sub-module 2 constituting the upper converter arm 1a and the lower converter arm 1b is provided with at least one redundant sub-module 3 having the same form as the sub-module 2, for redundancy operation of the sub-module 2. The redundant sub-module 3 is to replace a sub-module in which a failure occurs among a plurality of sub-modules 2 in operation, and is input and operated instead of a sub-module in which the failure occurs.

However, since the redundant sub-module 3 of the related art may not be commonly applied to the upper converter arm 1a and the lower converter arm 1b, there is a problem in that separate redundant sub-modules 3 are needed to be respectively provided for the upper converter arm 1a and the lower converter arm 1b, thereby causing the inconvenience and increasing the cost.

DISCLOSURE

Technical Problem

Accordingly, an objective of the present invention is to provide a MMC converter including a sub-module commonly applicable to an upper converter arm and a lower converter arm in a MMC converter and a sub-module thereof.

Technical Solution

In order to achieve the objective of the present invention, there is provided a sub-module of a MMC converter according to an exemplary embodiment of the present invention, the sub-module including: a first power semiconductor switch and a second power semiconductor switch connected in series in a same direction, each comprising a semiconductor switch and a diode connected in anti-parallel to the semiconductor switch; a capacitor connected in parallel to the first power semiconductor switch and the second power semiconductor switch connected in series; a first terminal connected to a first node between the first and second power semiconductor switches; a second terminal connected to a second node between the second power semiconductor switch and the capacitor; a third power semiconductor switch of which one side is connected to the second node, the third power semiconductor switch comprising a semiconductor switch and a diode connected in anti-parallel to the semiconductor switch; and a third terminal connected to a terminal of an AC grid system and connected to the other side of the third power semiconductor switch.

In addition, according to another exemplary embodiment of the present invention, there is provided a sub-module of a MMC converter, the sub-module including: a first power semiconductor switch and a second power semiconductor switch connected in series in a same direction, each comprising a semiconductor switch and a diode connected in anti-parallel to the semiconductor switch; a capacitor connected in parallel to all of a first power semiconductor switch and the second power semiconductor switch connected in series; a first terminal connected to a first node between the first and second power semiconductor switches; a second terminal connected to a second node between the second power semiconductor switch and the capacitor; a third power semiconductor switch of which one side is connected to the first node, the third power semiconductor switch comprising a semiconductor switch and a diode connected in anti-parallel to the semiconductor switch; and a third terminal connected to a terminal of an AC grid system and connected to the other side of the third power semiconductor switch.

In addition, according to an exemplary embodiment of the present invention, there is provided a redundant sub-module of a MMC converter, the redundant sub-module including: a first power semiconductor switch and a second power semiconductor switch connected in series in a same direction, each comprising a semiconductor switch and a diode connected in anti-parallel to the semiconductor switch. a capacitor connected in parallel to the first power semiconductor switch and the second power semiconductor switch connected in series; a first terminal connected to a first node between the first and second power semiconductor switches; a second terminal connected to a second node between the second power semiconductor switch and the capacitor; a third power semiconductor switch of which one side is connected to the second node, the third power semiconductor switch comprising a semiconductor switch and a diode connected in anti-parallel to the semiconductor switch; and a third terminal connected to the other side of the third power semiconductor switch and connected to a terminal of an AC grid system, wherein the redundant sub-module is connected between an upper converter arm and a lower converter arm composed of a plurality of sub-modules connected in series to each other and is configured to be applicable in common to the upper converter arm and the lower converter arm constituting the MMC converter such that the redundant sub-module operates by replacing a sub-module in which a failure occurs among the plurality of sub-modules constituting the upper converter arm or the lower converter arm.

In addition, according to another exemplary embodiment of the present invention, there is provided a redundant sub-module of a MMC converter, the redundant sub-module including: a first power semiconductor switch and a second power semiconductor switch connected in series in a same direction, each comprising a semiconductor switch and a diode connected in anti-parallel to the semiconductor switch; a capacitor connected in parallel to the first power semiconductor switch and the second power semiconductor switch connected in series; a first terminal connected to a first node between the first and second power semiconductor switches; a second terminal connected to a second node between the second power semiconductor switch and the capacitor; a third power semiconductor switch of which one side is connected to the first node, the third power semiconductor switch comprising a semiconductor switch and a diode connected in anti-parallel to the semiconductor switch; and a third terminal connected to a terminal of an AC grid system and connected to the other side of the third power semiconductor switch, wherein the redundant sub-module is connected between an upper converter arm and a lower converter arm composed of a plurality of sub-modules connected in series to each other and is configured to be applicable in common to the upper converter arm and the lower converter arm constituting the MMC converter such that the redundant sub-module operates by replacing a sub-module in which a failure occurs among the plurality of sub-modules constituting the upper converter arm or the lower converter arm.

In addition, according to an exemplary embodiment of the present invention, there is provided a MMC converter including: an upper converter arm composed of a plurality of sub-modules connected in series to each other; and a lower converter arm composed of a plurality of sub-modules connected in series to each other and connected in series to a sub-module of the upper converter arm, wherein each of the sub-modules comprises: a first power semiconductor switch and a second power semiconductor switch connected in series in a same direction, each including a semiconductor switch and a diode connected in anti-parallel to the semiconductor switch; a capacitor connected in parallel to the first power semiconductor switch and the second power semiconductor switch connected in series; a first terminal connected to a first node between the first and second power semiconductor switches; a second terminal connected to a second node between the second power semiconductor switch and the capacitor; a third power semiconductor switch of which a side is connected to the second node, the third power semiconductor switch comprising a semiconductor switch and a diode connected in anti-parallel to the semiconductor switch; and a third terminal connected to a terminal of the AC grid system and connected to the other side of the third power semiconductor switch.

In addition, according to another exemplary embodiment of the present invention, there is provided a MMC converter including: an upper converter arm composed of a plurality of sub-modules connected in series to each other; and a lower converter arm composed of a plurality of sub-modules connected in series to each other and connected in series to a sub-module of the upper converter arm, wherein each of the sub-modules comprises: a first power semiconductor switch and a second power semiconductor switch connected in series in a same direction, each including a semiconductor switch and a diode connected in anti-parallel to the semiconductor switch; a capacitor connected in parallel to the first power semiconductor switch and the second power semiconductor switch connected in series; a first terminal connected to a first node between the first and second power semiconductor switches; a second terminal connected to a second node between the second power semiconductor switch and the capacitor; a third power semiconductor switch of which a side is connected to the first node, the third power semiconductor switch comprising a semiconductor switch and a diode connected in anti-parallel to the semiconductor switch; and a third terminal connected to a terminal of the AC grid system and connected to the other side of the third power semiconductor switch.

In addition, according to yet another exemplary embodiment of the present invention, there is provided a MMC converter including: an upper converter arm composed of a plurality of sub-modules connected in series to each other; a lower converter arm composed of a plurality of sub-modules connected in series to each other; and at least one redundant sub-module connected in series between the upper and lower converter arms and commonly applicable to the upper and lower converter arms, wherein the redundant sub-module comprises: a first power semiconductor switch and a second power semiconductor switch connected in series in a same direction, each including a semiconductor switch and a diode connected in anti-parallel to the semiconductor switch; a capacitor connected in parallel to the first power semiconductor switch and the second power semiconductor switch connected in series; a first terminal connected to a first node between the first and second power semiconductor switches; a second terminal connected to a second node between the second power semiconductor switch and the capacitor; a third power semiconductor switch of which a side is connected to the second node, the third power semiconductor switch including a semiconductor switch and a diode connected in anti-parallel to the semiconductor switch; and a third terminal connected to a terminal of an AC grid system and connected to the other side of the third power semiconductor switch.

In addition, according to still another exemplary embodiment of the present invention, there is provided a MMC converter including: an upper converter arm composed of a plurality of sub-modules connected in series to each other; a lower converter arm composed of a plurality of sub-modules connected in series to each other; and at least one redundant sub-module connected in series between the upper and lower converter arms and commonly applicable to the upper and lower converter arms, wherein the redundant sub-module comprises: a first power semiconductor switch and a second power semiconductor switch connected in series in a same direction, each including a semiconductor switch and a diode connected in anti-parallel to the semiconductor switch; a capacitor connected in parallel to the first power semiconductor switch and the second power semiconductor switch connected in series; a first terminal connected to a first node between the first and second power semiconductor switches; a second terminal connected to a second node between the second power semiconductor switch and the capacitor; a third power semiconductor switch of which a side is connected to the first node, the third power semiconductor switch including a semiconductor switch and a diode connected in anti-parallel to the semiconductor switch; and a third terminal connected to a terminal of an AC grid system and connected to the other side of the third power semiconductor switch.

Advantageous Effects

In the MMC converter of the related art, at least two redundant sub-modules were applied to the upper and lower converter arms. However, in the MMC converter according to the present invention, one sub-module is commonly applied to the upper and lower converter arms, thereby simplifying the structure of the circuit and reducing the cost and improving the reliability of the MMC converter.

DESCRIPTION OF DRAWINGS

FIG. 7a and FIG. 7b are operation diagrams illustrating an example of the MMC converter to which the sub-module of FIG. 4 is applied.

MODE FOR INVENTION

Figure 1A:
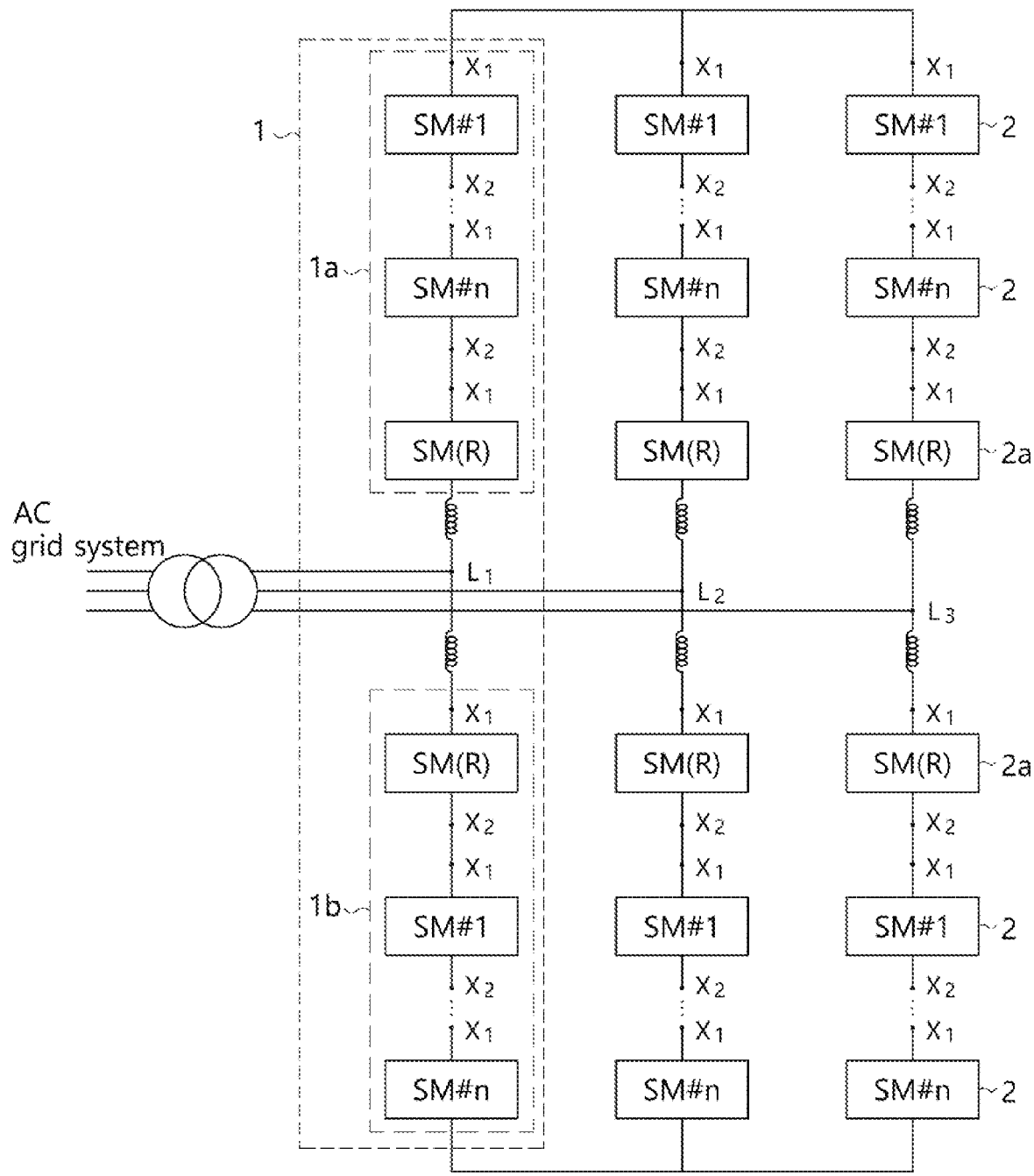
FIG. 1a and FIG. 1b are circuit diagrams of a conventional MMC converter.
Figure 1B:
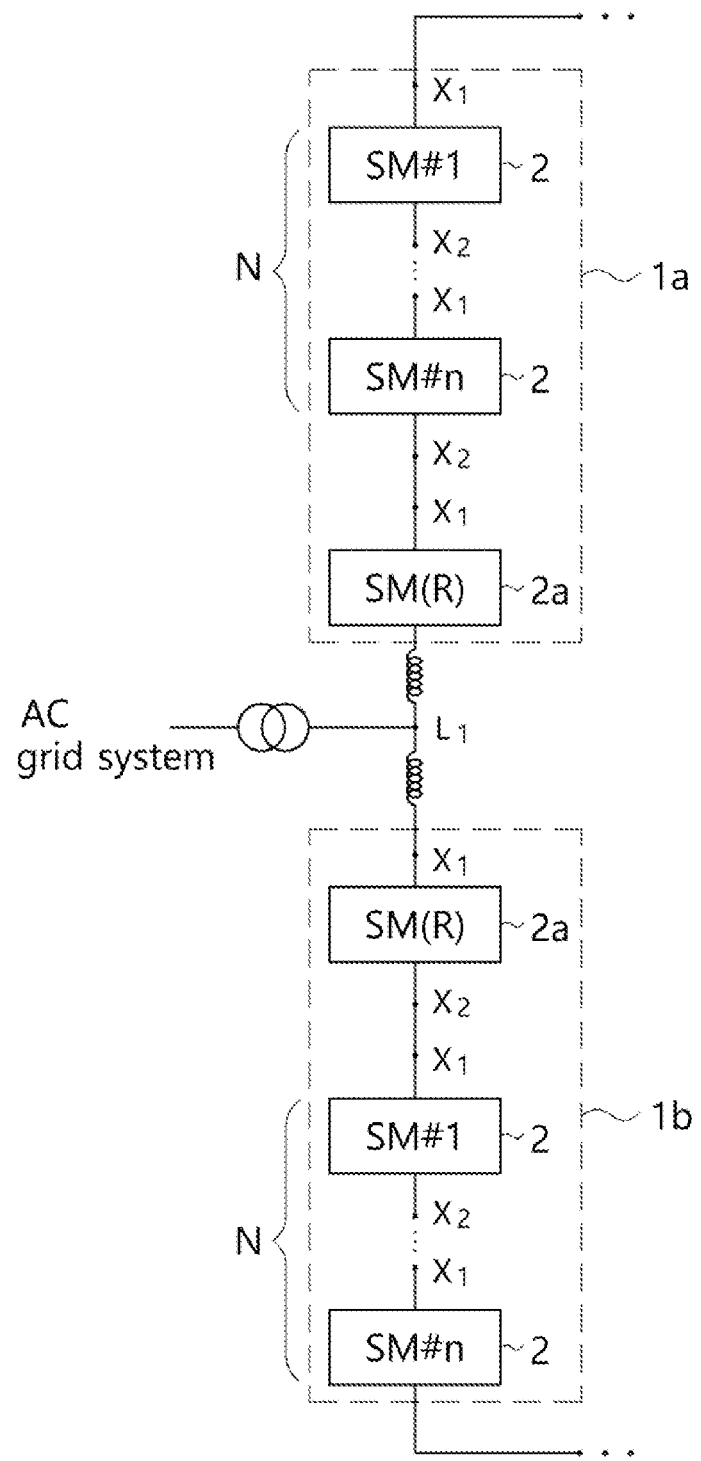
Figure 2A:
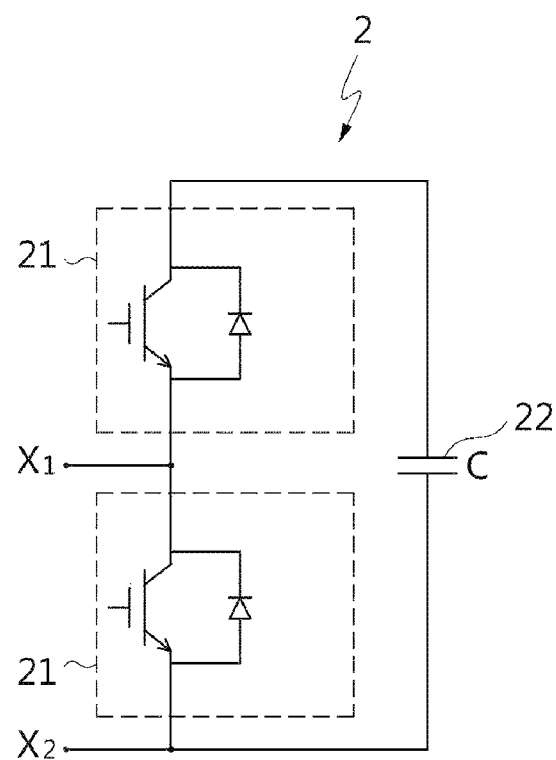
FIGS. 2a and 2b are configuration diagrams of a sub-module applied to the conventional MMC converter.
Figure 2B:
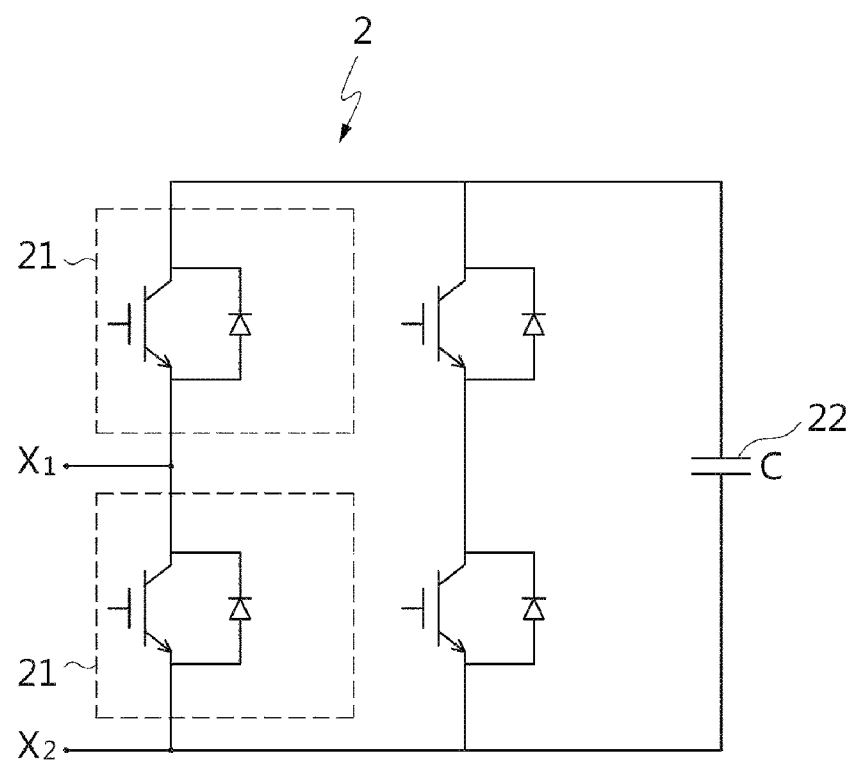

Hereinafter, exemplary embodiments of the present invention are described in detail with reference to the accompanying drawings. In adding reference numerals to the components of each drawing, it should be noted that the same reference numerals are used to refer to the same components as much as possible even if displayed on different drawings. Further, in the following description, if it is decided that the detailed description of a known function or configuration related to the invention makes the subject matter of the invention unclear, the detailed description is omitted.

Further, when describing the components of the present invention, terms such as first, second, A, B, (a) or (b) may be used. Since these terms are provided merely for the purpose of distinguishing the components from each other, they do not limit the nature, sequence, or order of the components. If a component is described as being "connected", "coupled", or "linked" to another component, that component may be directly connected or connected to that other component, however it should be understood that yet another component between each of the components may be "connected", "coupled", or "linked" to each other.

Figure 3:
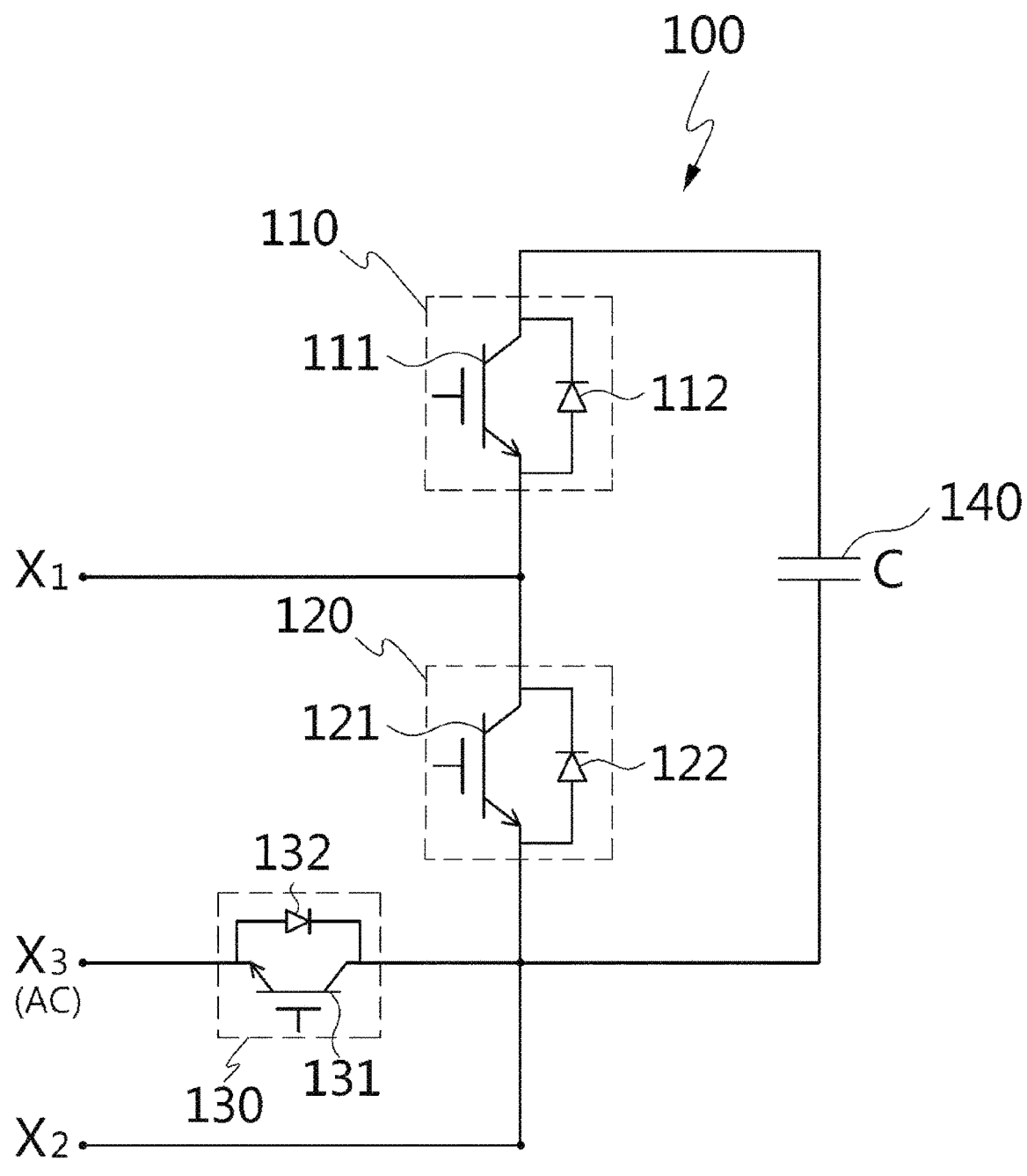
FIG. 3 is the configuration diagram of the sub-module according to the first exemplary embodiment of the present invention.

FIG. 3 is the configuration diagram of the sub-module according to the first exemplary embodiment of the present invention.

Referring to FIG. 3, a sub-module 100 according to the first exemplary embodiment of the present invention may include a first power semiconductor switch 110, a second power semiconductor switch 120, and a third power semiconductor switch 130, and a capacitor 140.

The first power semiconductor switch 110 includes a first semiconductor switch 111 and a first diode 112 connected in anti-parallel to the first semiconductor switch 111, and the second power semiconductor switch 120 includes a second semiconductor switch 121 and a second diode 122 connected in anti-parallel to the second semiconductor switch 121. Here, the first power semiconductor switch 110 and the second power semiconductor switch 120 are connected in series in the same direction.

The capacitor 140 is connected in parallel to the first and second power semiconductor switches 110 and 120 connected in series to each other as described above.

In this case of the sub-module 100, the first terminal X1 is connected to the first node N1 between the first and second power semiconductor switches 110 and 120, and the second terminal X2 is connected to the second node N2 between the second power semiconductor switches 120 and the capacitor 150. One end of the third power semiconductor switch 130 is connected to the second node N2, and the other end of the third power semiconductor switch is connected to the third terminal X3 connected to an input and output terminal of an AC grid system. That is, the third terminal X3 is a terminal connected to the AC grid system, and the third power semiconductor switch 130 is connected to the AC grid system through the third terminal X3. These first to third nodes N1 to N3 are points where branch lines for connecting respective terminals are connected to connection lines between the corresponding components.

The third power semiconductor switch 130 includes a third semiconductor switch 131 and a third diode 132 connected in anti-parallel to the third semiconductor switch 131. In this case, a cathode of the third diode 132 of the third power semiconductor switch 130 is connected to the second node N2 and an anode is connected to the third terminal X3.

Here, the sub-module 100 may be used as a plurality of sub-modules constituting the upper and lower converter arms 11a and 11b in the MMC converter. Also, the sub-modules 100 may be used as a redundant sub-module input when a failure occurs in these sub-modules. When used as a redundant sub-module, the sub-module is connected between the upper converter arm 11a and the lower converter arm 11b in the MMC converter and replaces a failed sub-module among the plurality of sub-modules 12a and 12b comprising the upper converter arm 11a or the lower converter arm 11b to operate as a sub-module in the MMC converter.

The first terminal X1 and the second terminal X2 are connected to terminals of other normal sub-modules, and the third terminal X3 is connected to a terminal of the AC grid system. When a sub-module 100 is applied as a redundant sub-module 100, the sub-module is connected in series with another sub-module of a converter arm among the upper converter arm 11a or the lower converter arm 11b. In this case, the first terminal X1 is connected to one of two terminals of the lowermost sub-module 12a-n of the upper converter arm 11a, and the second terminal X2 is connected to one of the two terminals of the uppermost sub-module 12b-1 of the lower converter arm 11b. The third terminal X3 is connected to a terminal of the AC grid system.

As described above, each sub-module 100 shown in FIG. 3 is provided with the first and second terminals X1 and X2 for connecting in series with other sub-modules at the upper and lower converter arms, and at the same time, includes a third terminal X3 for connecting to the AC grid system. Thus, the sub-module 100 is directly connected to the AC grid system when used as a sub-module in the upper and lower converter arms 11a and 11b and when used as a redundant sub-module.

Figure 4:
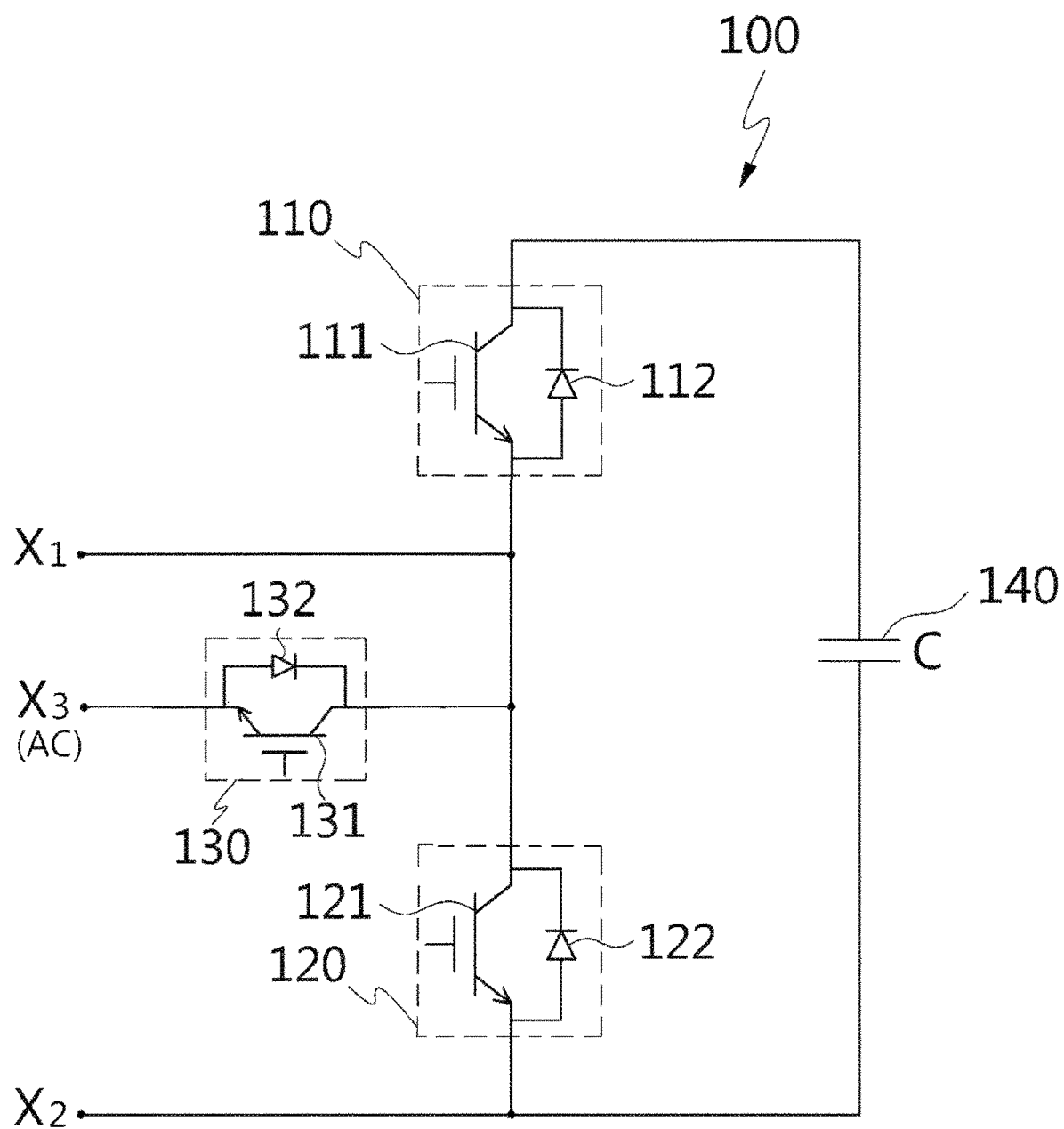
FIG. 4 is a configuration diagram of a sub-module according to a second exemplary embodiment of the present invention.

FIG. 4 is a configuration diagram of a sub-module according to a second exemplary embodiment of the present invention.

Referring to FIG. 4, a sub-module 200 according to the second exemplary embodiment of the present invention may include a first power semiconductor switch 210, a second power semiconductor switch 220, and a third power semiconductor switch 230, and a capacitor 240.

The first power semiconductor switch 210 includes a first semiconductor switch 211 and a first diode 212 connected in anti-parallel to the first semiconductor switch 211, and the second power semiconductor switch 220 includes a second semiconductor switch 221 and a second diode 222 connected in anti-parallel to the second semiconductor switch 221. Here, the first power semiconductor switch 210 and the second power semiconductor switch 220 are connected in series in the same direction.

The capacitor 240 is connected in parallel to the first and second power semiconductor switches 210 and 220 connected in series to each other as described above.

In this case of the sub-module 200, the first terminal X1 is connected to the first node N1 between the first and second power semiconductor switches 210 and 220, and the second terminal X2 is connected to the second node N2 between the second power semiconductor switches 220 and the capacitor 150. One end of the third power semiconductor switch 230 is connected to the second node N1, and the other end of the third power semiconductor switch is connected to the third terminal X3 connected to the input and output terminal of the AC grid system. That is, the third terminal X3 is a terminal connected to the AC grid system, and the third power semiconductor switch 230 is connected to the AC grid system through the third terminal X3. These first to third nodes N1 to N3 are points where branch lines for connecting respective terminals are connected to connection lines between the corresponding components.

The third power semiconductor switch 230 includes a third semiconductor switch 131 and a third diode 132 connected in anti-parallel to the third semiconductor switch 131. In this case, a cathode of the third diode 132 of the third power semiconductor switch 130 is connected to the second node N1 and an anode is connected to the third terminal X3.

Here, the sub-module 200 may be used as a plurality of sub-modules constituting the upper and lower converter arms 11a and 11b in the MMC converter. Also, the sub-modules 200 may be used as a redundant sub-module input when a failure occurs in these sub-modules. When used as a redundant sub-module, the sub-module is connected between the upper converter arm 11a and the lower converter arm 11b in the MMC converter and replaces a failed sub-module among the plurality of sub-modules 12a and 12b comprising the upper converter arm 11a or the lower converter arm 11b to operate as a sub-module in the MMC converter.

The first terminal X1 and the second terminal X2 are connected to terminals of other normal sub-modules, and the third terminal X3 is connected to a terminal of the AC grid system. When a sub-module 200 is applied as a redundant sub-module 200, the sub-module is connected in series with another sub-module of a converter arm among the upper converter arm 11a or the lower converter arm 11b. In this case, the first terminal X1 is connected to one of two terminals of the lowermost sub-module 12a-n of the upper converter arm 11a, and the second terminal X2 is connected to one of the two terminals of the uppermost sub-module 12b-1 of the lower converter arm 11b. The third terminal X3 is connected to a terminal of the AC grid system.

As described above, each sub-module 200 shown in FIG. 4 is provided with the first and second terminals X1 and X2 for connecting in series with other sub-modules at the upper and lower converter arms as same as the sub-module 100 shown in FIG. 3, and at the same time, includes the third terminal X3 for connecting to the AC grid system. Thus, the sub-module 200 is directly connected to the AC grid system when used as a sub-module in the upper and lower converter arms 11a and 11b and when used as a redundant sub-module.

Figure 5:
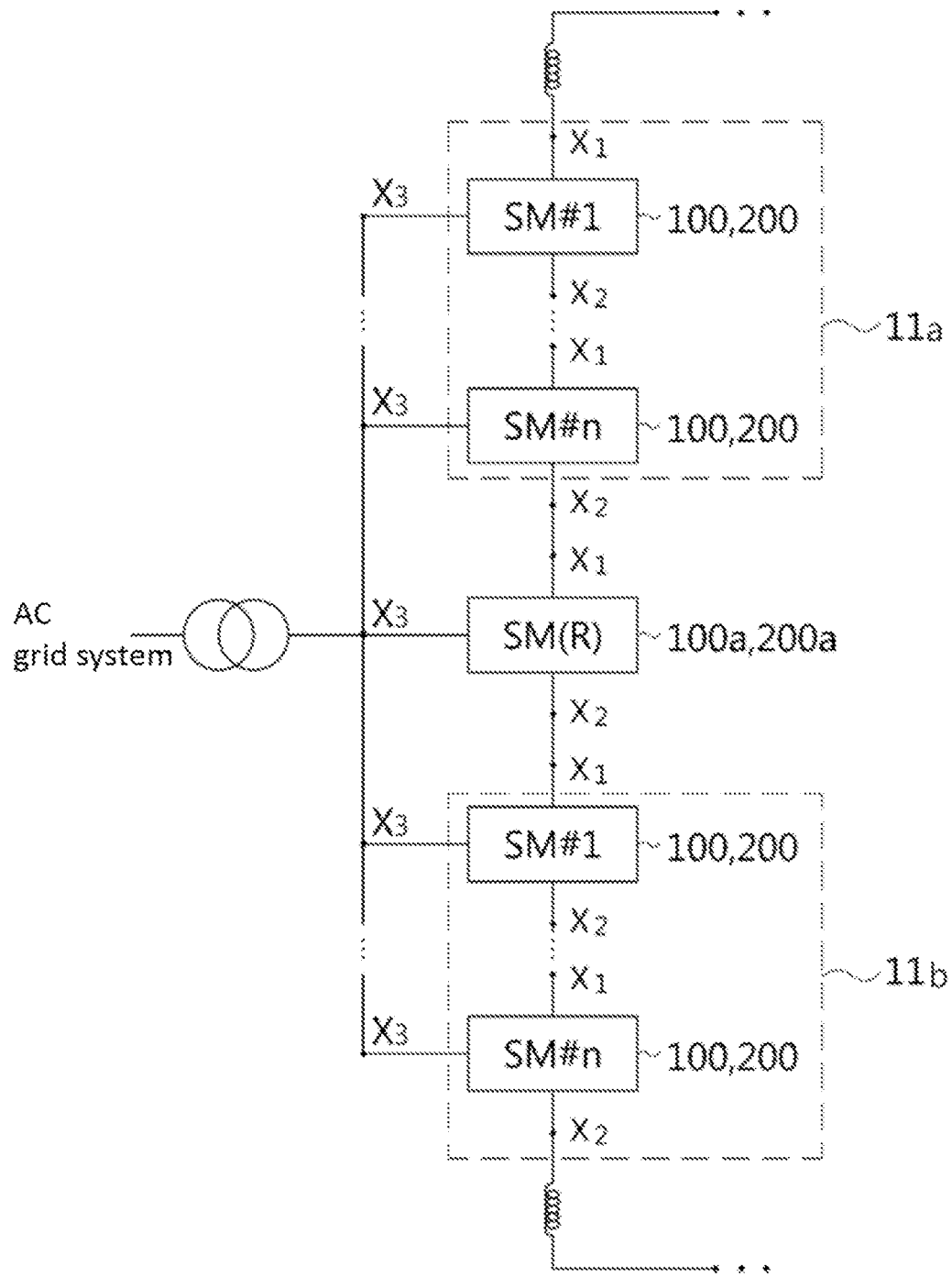
FIG. 5 is a circuit diagram of a MMC converter to which a sub-module is applied according to an exemplary embodiment of the present invention.

FIG. 5 is a circuit diagram of a MMC converter to which a sub-module is applied according to the present invention.

Referring to FIG. 5, the MMC converter to which the sub-modules 100 and 200 are applied according to the present invention includes N sub-modules 100 and 200 and at least one redundant sub-module 100a and 200a. Here, the N sub-modules 100 and 200 and the redundant sub-modules 100a and 200 are given different reference numerals for convenience of description, however actually have the same configurations as shown in FIGS. 3 and 4. The redundant sub-modules 100a and 200a are input and operated by replacing the sub-modules in which the failure occurs when a failure occurs in any of the N sub-modules 100 and 200.

Although one redundant sub-module 100a or 200a is exemplarily illustrated in the drawing, this is an example, and the redundant sub-module 100a and 200a may be provided with at least one or more. In particular, unlike the related art having a redundant sub-module 2a in the upper converter arm 1a and the lower converter arm 1b, respectively, the present invention is provided with the redundant sub-modules 100a and 200a that may be used in common to the upper converter arm 11a and the lower converter arm 11b.

For example, in the related art, two redundant sub-modules 2a are provided, one for each of the upper and lower converter arms 1a and 1b, but the present invention includes only one sub-module 100a or 200a which may be commonly used for the upper and lower converter arms 11a and 11b so that when a failure occurs in any one of the sub-modules of the upper or lower converter arms 11a or 11b, the failed sub-module may be replaced with the upper or lower converter arms 11a or 11b. As a result, the number of redundant sub-modules may be reduced compared to the related art, thereby having an effect in terms of cost saving. In the present invention, the number of redundant sub-modules will be selectively determined according to the characteristics of the MMC converter and the number of sub-modules of the converter arm.

In addition, as may be seen in FIG. 5, each of the sub-modules 100, 200, 100a, and 200a in the MMC converter according to the present invention has a feature that is directly connected to the AC grid system through the third terminal X3.

Figures 6A, 6B:
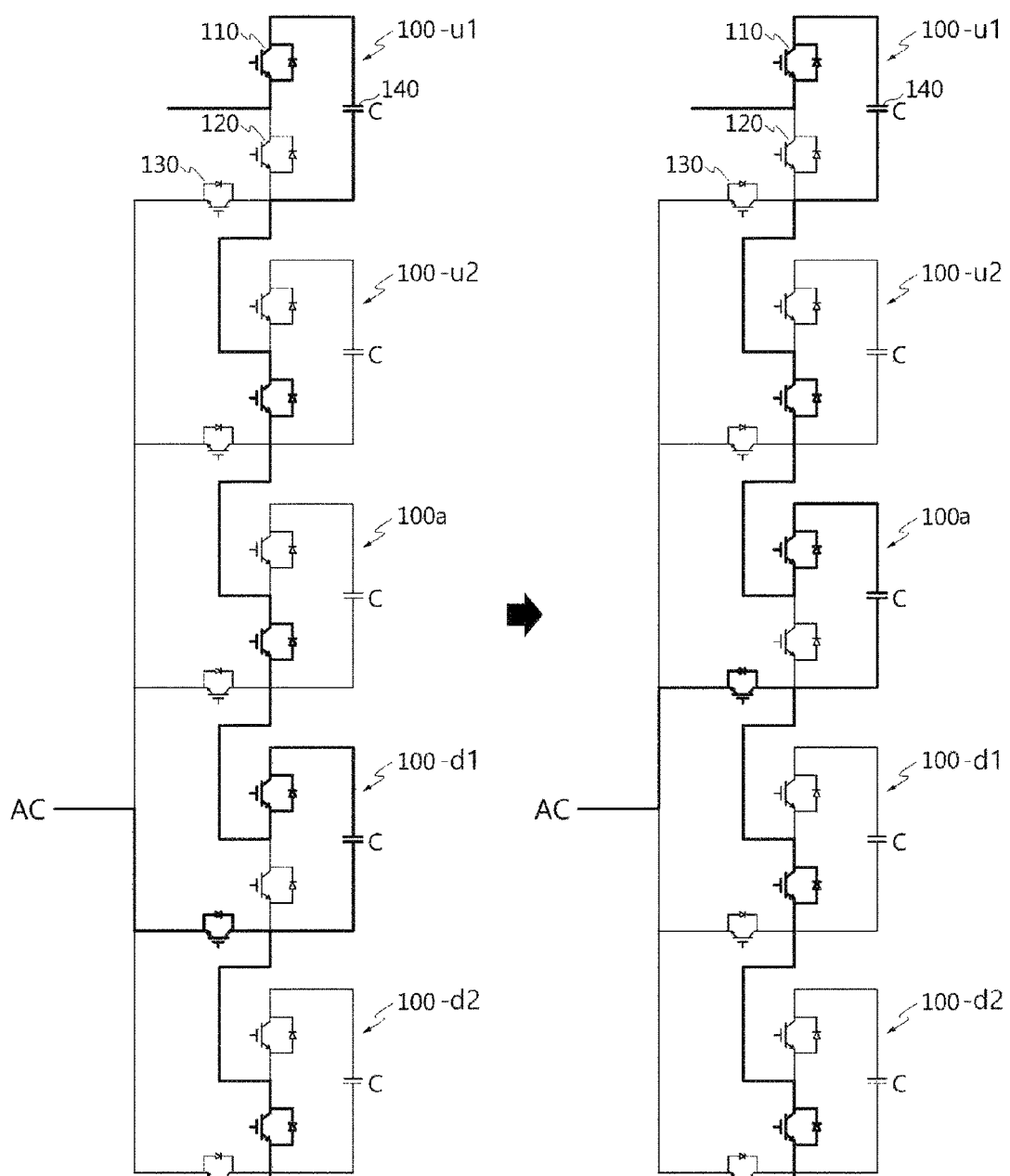
FIG. 6a and FIG. 6b are operation diagrams illustrating an example of the MMC converter to which the sub-module of FIG. 3 is applied.

FIG. 6a and FIG. 6b are operation diagrams illustrating an example of the MMC converter to which the sub-module of FIG. 3 is applied.

In FIG. 6a and FIG. 6b, for example, the upper converter arm 11a and the lower converter arm 11b are each provided with two sub-modules, which are 200-u1, 200-u2, 200-d1, and 200-d2. Also, the current flow is illustrated according to an operation in the MMC converter to which one of the redundant sub-module 100a is connected between the upper and lower converter arms 11a and 11b.

First, in the view of FIG. 6a and FIG. 6b, an example is illustrated in which a sub-module 100-u2 having a failure is replaced with the redundant sub-module 100a when the current is bypassed due to a failure in the second sub-module 100-u2 of the upper converter arm 11a during each two sub-modules, which are 100-u1, 100-u2, 100-d1, and 100-d2, is in normal operation in the upper converter arm 11a and the lower converter arm 11b.

The failed sub-module 100-u2 turns on the second power semiconductor switch 120 to bypass the current, so that the current supplied from the upper sub-module 100-u1 through the first terminal X1 is to flow to the second terminal X2 through the second power semiconductor switch 120 so as to supply the current to the redundant sub-module 100-d1.

The redundant sub-module 100 replaces the failed sub-module 100-u2, and for this purpose, the first and third power semiconductor switches 110 and 130 are turned on and the second power semiconductor switch 120 remains turned off. As a result, the current bypassed from the sub-module 100-u2 having a failure as described above is supplied through the first terminal X1 so that the current flows to the second terminal X2 through the first power semiconductor switch 110 and the capacitor 140, and the current is supplied to the AC grid system as the third power semiconductor switch 130 is turned on.

The redundant sub-module 100a may be input by substituting the failed sub-module in the same principle as described above, depending on the number of redundant sub-modules 100a provided.

Here, as shown in the diagram, when additional failure occurs in another sub-module of the upper converter arm 11a while all the redundant sub-module 100a are input, any one of the plurality of sub-modules constituting the lower converter arm 11b may be operated as a sub-module of the upper converter arm 11a as shown in the view of FIG. 6b.

For example, when a failure occurs in the redundant sub-module 100a that is replaced for the failed sub-module 100-u2 as described above, the sub-module 100-d1 of the lower converter arm 11b as shown in the view of FIG. 6b may switch to the sub-module of the upper converter arm 11a.

In the view of FIG. 6b, for example, the sub-module 100-d1 of the lower converter arm 11b is switched to operate as a sub-module of the upper converter arm 11a. To this end, the first and third power semiconductor switches 110 and 130 are turned on and the second power semiconductor switch 120 is turned off. As a result, the current is supplied to the first terminal X1 so that the current flows to the second terminal X2 through the first power semiconductor switch 110 and the capacitor 140, and the current is supplied to the AC grid system as the third power semiconductor switch 130 is turned on.

In this case, since the redundant sub-module 100a is already operating as a sub-module of the upper converter arm 11a, the third power semiconductor switch 230 is turned off to shut off the current supply to the AC grid system.

In this way, the sub-module 100 according to the present invention may be applied as a sub-module comprising the upper converter arm 11a and the lower converter arm 11a, and may also be applied as a redundant sub-module connected between the upper and lower converter arms 11a and 11b. In addition, during operation of the MMC converter, the sub-module of the lower converter arm 11b may be switched to operate while operating as the sub-module of the upper converter arm 11a. The opposite case is also applicable.

As described above, according to the exemplary embodiment of the present invention, the sub-module 100 may operate the MMC converter by controlling a switching operation of turning on or turning off for the first to third power semiconductor switches 110 to 130 according to a case when the sub-module operates as a sub-module constituting the upper and lower converter arms 11a and 11b or when the sub-module operates as a redundant sub-module connected between the upper and lower converter arms 11a and 11b.

As the example shown in the views of FIG. 6a and FIG. 6b, the switching operation of the first to fourth power semiconductor switches 110 to 140 varies depending on which of the converter arms 11a or lower converter arm 11b the sub-module 100 operates as a sub-module. Also, this switching operation varies depending on the flow of current.

In particular, when the sub-module 100 operates as a sub-module of the upper converter arm 11a, when the voltage of the AC grid system is not input to the third terminal X3, the sub-module 100 operates as one of N sub-modules of the upper converter arm 11a and when the voltage of the AC grid system is input, the sub-module 100 operates as a redundant sub-module 100a of the upper converter arm 11a. In addition, when the sub-module 100 operates as a sub-module of the lower converter arm 11b, when the voltage of the AC grid system is not input to the third terminal X3, the sub-module 100 operates as one of N sub-modules of the lower converter arm 11b and when the voltage of the AC grid system is input, the sub-module 100 operates as a redundant sub-module 100a of the lower converter arm 11b.

FIG. 7 is an operation diagram illustrating an example of the MMC converter to which the sub-module of FIG. 4 is applied.

In FIGS. 7a and 7b, for example, the upper converter arm 11a and the lower converter arm 11b are each provided with two sub-modules, which are 200-u1, 200-u2, 200-d1, and 200-d2. Also, the current flow is illustrated according to the operation in the MMC converter to which one of the redundant sub-module 200a is connected between the upper and lower converter arms 11a and 11b.

First, in a view of FIG. 7a, an example is illustrated in which a sub-module 200-u2 having a failure is replaced with the redundant sub-module 200a when the current is bypassed due to a failure in the second sub-module 200-u2 of the upper converter arm 11a during each two sub-modules, which are 100-u1, 100-u2, 100-d1, and 100-d2, is in normal operation in the upper converter arm 11a and the lower converter arm 11b.

The failed sub-module 200-u2 turns on the second power semiconductor switch 220 and turns off the first and third power semiconductor switches 210 and 230 to bypass the current, so that the current supplied from the upper sub-module 200-u1 through the first terminal X1 is to flow to the second terminal X2 through the second power semiconductor switch 220 so as to supply the current to the lower sub-module 200-d1.

The redundant sub-module 200a replaces the failed sub-module 200-u2, and for this purpose, the first power semiconductor switch 210 is turned on and the second and third power semiconductor switches 220 and 230 remain turned off. As a result, the current bypassed from the sub-module 200-u2 having a failure as described above is supplied through the first terminal X1 so that the current flows to the second terminal X2 through the first power semiconductor switch 210 and the capacitor 240.

The redundant sub-module 200a may be input by substituting the failed sub-module in the same principle as described above, depending on the number of redundant sub-modules 200a provided.

Here, as shown in the diagram, when additional failure occurs in another sub-module of the upper converter arm 11a while all the redundant sub-module 200a are input, any one of the plurality of sub-modules constituting the lower converter arm 11b may be operated as a sub-module of the upper converter arm 11a as shown in a view of FIG. 7b.

For example, when a failure occurs in the redundant sub-module 200a that is replaced for the failed sub-module 200-u2 as described above, the sub-module 200-d1 of the lower converter arm 11b as shown in the view of FIG. 7b may switch to the sub-module of the upper converter arm 11a.

In the view of FIG. 7b, for example, the sub-module 200-d1 of the lower converter arm 11b is switched to operate as a sub-module of the upper converter arm 11a. To this end, the second power semiconductor switch 220 is turned off and the first power semiconductor switch 210 is turned on. As a result, the current bypassed from the failed sub-module 200-u1 as described above is supplied to the first terminal X1 so that the current flows to the second terminal X2 through the first power semiconductor switch 210 and the capacitor 240 to be supplied to the lower sub-module 100-d1.

In this case, since the redundant sub-module 200a is already operating as a sub-module of the upper converter arm 11a, the third power semiconductor switch 230 is turned off to shut off the current supply to the AC grid system. Then, the sub-module 100-d2 of the lower converter arm 11b operates as the uppermost sub-module of the lower converter arm 11b so that the third power semiconductor switch 230 is turned on to supply current to the AC grid system.

In this way, the sub-module 200 according to the present invention may be applied as a sub-module comprising the upper converter arm 11a and the lower converter arm 11a, and may also be applied as a redundant sub-module connected between the upper and lower converter arms 11a and 11b. In addition, during operation of the MMC converter, the sub-module of the lower converter arm 11b may be switched to operate while operating as the sub-module of the upper converter arm 11a. The opposite case is also applicable.

As described above, according to the exemplary embodiment of the present invention, the sub-module 200 may operate the MMC converter by controlling a switching operation of turning on or turning off for the first to third power semiconductor switches 210 to 230 according to a case when the sub-module operates as a sub-module constituting the upper and lower converter arms 11a and 11b or when the sub-module operates as a redundant sub-module connected between the upper and lower converter arms 11a and 11b.

FIGS. 8a-8d, 9a-9d are flow charts illustrating the current flow depending on a switching operation of a sub-module according to an exemplary embodiment of the present invention. FIGS. 8a-8d are diagrams illustrating a switching operation of the sub-module 100 of FIG. 3, and FIGS. 9a-9d are views illustrating a switching operation for a sub-module 200 of FIG. 4.

Figure 8A:
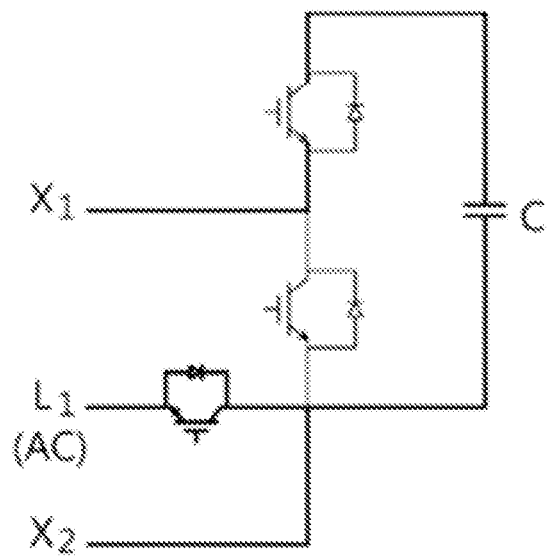
FIGS. 8a-8d are flow charts for the current flow according to a switching operation of a sub-module of FIG. 3.
Figure 8B:
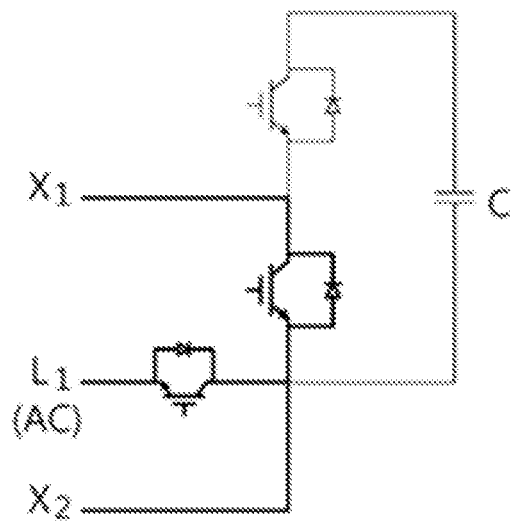

The views of FIG. 8a and FIG. 8b show an example of charging the capacitor 140 and an example of bypassing the current when the current is output to the AC grid system, respectively. Also, the views of FIG. 8c and FIG. 8d show an example of charging the capacitor 140 and an example of bypassing the current when no current is output to the AC grid system.

In the view of FIG. 8a, the current is supplied through the first terminal X1 as the first and third power semiconductor switches 110 and 130 are turned on and the second power semiconductor switch 120 is turned off. Then, the current flows to the second terminal X2 through the first power semiconductor switch 110 and the capacitor 140 to be supplied to another lower sub-module (not shown), and at the same time, the current flows to the third terminal X3 through the third power semiconductor switch 130 to be supplied to the AC grid system.

In the view of FIG. 8b, the current is supplied through the first terminal X1 as the first power semiconductor switch 110 is turned off and the second and third power semiconductor switches 120 and 130 are turned on. Then, the current flows to the second terminal X2 to be supplied to the other lower sub-module, and at the same time, the current flows to the third terminal X3 through the third power semiconductor switch 130 to be supplied to the AC grid system.

Figure 8C:
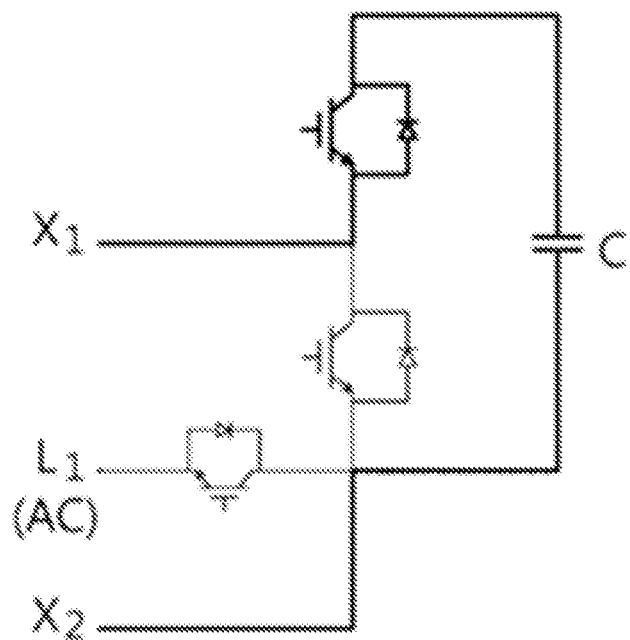
Figure 8D:
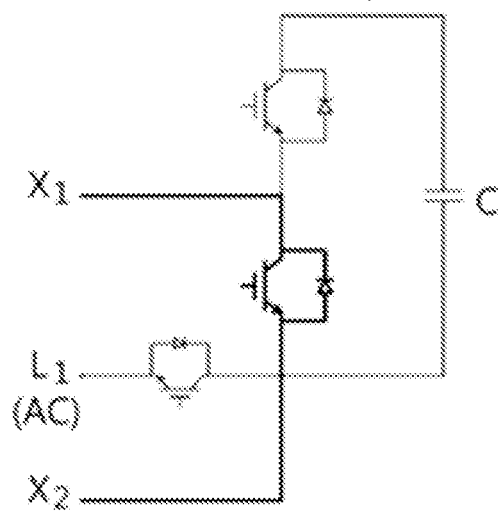

In the view of FIG. 8c, only the first power semiconductor switch 110 is turned on so that the current supplied through the first terminal X1 flows to the second terminal X2 through the capacitor 140 to be supplied to the other lower sub-module.

In the view of FIG. 8d, only the second power semiconductor switch 120 is turned on so that the current supplied through the first terminal X1 flows to the second terminal X2 to be supplied to another lower sub-module.

The switching operations of the first to third power semiconductor switches 110 to 130 according to the operation of each position and function of the sub-module 100 are shown in Table 1 below.

TABLE 1

| AC grid system Output | Capacitor Charging | First power Semiconductor Switch | Second power Semiconductor Switch | Third power Semiconductor Switch |
|---|---|---|---|---|
| Output | Vc | ON | OFF | ON |
|  | 0 (bypass) | OFF | ON | ON |
| No output | Vc | ON | OFF | OFF |
|  | 0 (bypass) | OFF | ON | OFF |

When the current is supplied to the AC grid system as shown in Table 1, the sub-module operates as a redundant sub-module. When the current is not supplied to the AC grid system, the sub-module operates as a sub-module of the converter arm.

Figure 9A:
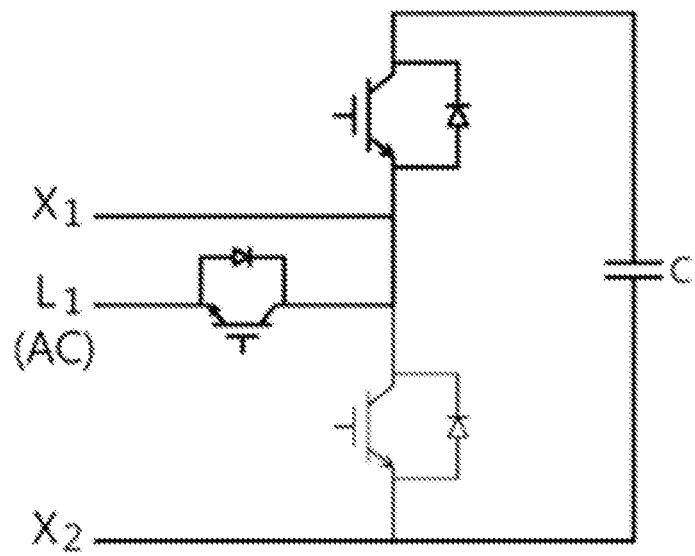
FIGS. 9a-9d are flow charts for the current flow according to a switching operation of a sub-module of FIG. 4.
Figure 9B:
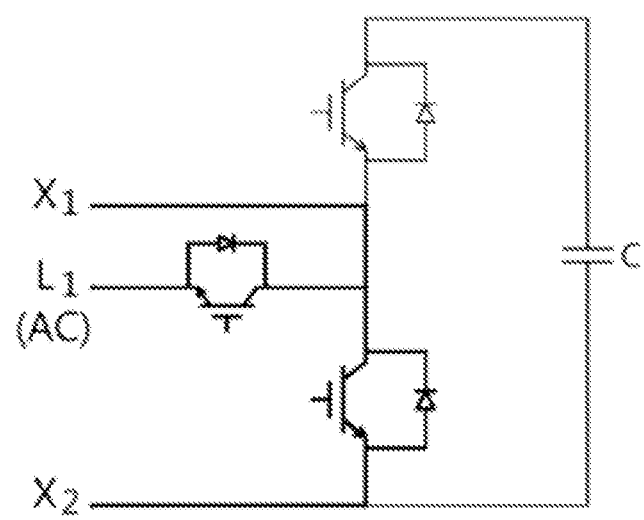

To the next, the views FIG. 9a and FIG. 9b also show an example of charging the capacitor 240 and an example of bypassing the current when the current is output to the AC grid system, respectively. Also, the views FIG. 9c and FIG. 9d also show an example of charging the capacitor 240 and an example of bypassing the current when no current is output to the AC grid system.

In the view of FIG. 9a, the current is supplied through the first terminal X1 as the first and third power semiconductor switches 210 and 230 are turned on and the second power semiconductor switch 220 is turned off. Then, the current flows to the second terminal X2 through the first power semiconductor switch 210 and the capacitor 240 to be supplied to another lower sub-module (not shown), and at the same time, the current flows to the third terminal X3 through the third power semiconductor switch 230 to be supplied to the AC grid system.

In the view of FIG. 9b, the current is supplied through the first terminal X1 as the first power semiconductor switch 210 is turned off and the second and third power semiconductor switches 220 and 230 are turned on. Then, the current flows to the second terminal X2 to be supplied to the other lower sub-module, and at the same time, the current flows to the third terminal X3 through the third power semiconductor switch 230 to be supplied to the AC grid system.

Figure 9C:
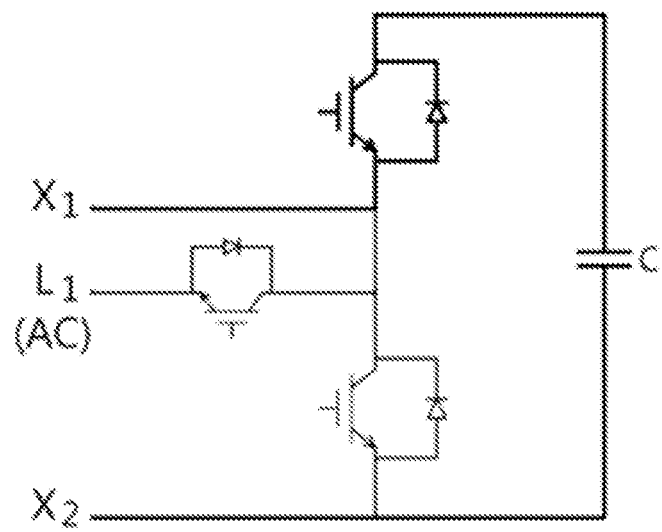

In the view of FIG. 9c, only the first power semiconductor switch 210 is turned on so that the current supplied through the first terminal X1 flows to the second terminal X2 through the capacitor 240 to be supplied to the other lower sub-module.

Figure 9D:
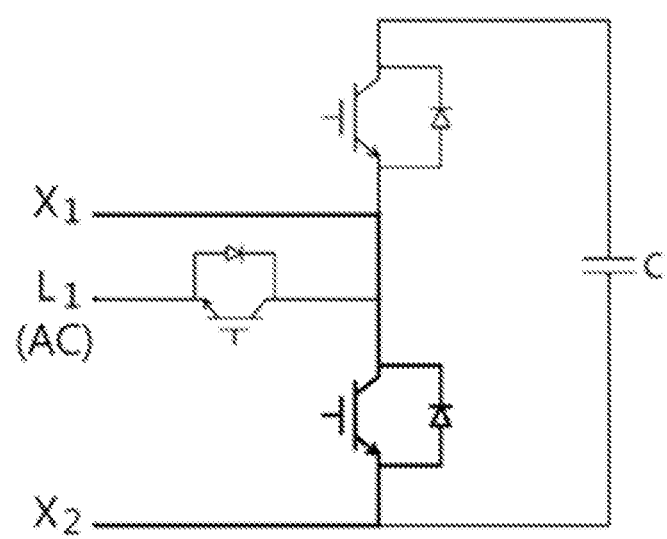

In the view of FIG. 9d, only the second power semiconductor switch 220 is turned on so that the current supplied through the first terminal X1 flows to the second terminal X2 to be supplied to another lower sub-module.

The switching operations of the first to third power semiconductor switches 210 to 230 according to the operation of each position and function of the sub-module 200 are shown in Table 2 below.

TABLE 2

| AC grid system Output | Capacitor Charging | First power Semiconductor Switch | Second power Semiconductor Switch | Third power Semiconductor Switch |
|---|---|---|---|---|
| Output | Vc | ON | OFF | ON |
|  | 0 (bypass) | OFF | ON | ON |
| No output | Vc | ON | OFF | OFF |
|  | 0 (bypass) | OFF | ON | OFF |

When the current is supplied to the AC grid system as shown in Table 2, the sub-module operates as a redundant sub-module. When the current is not supplied to the AC grid system, the sub-module operates as a sub-module of the converter arm.

As described above, the sub-modules 100 and 200 according to the present invention may be applied to the MMC converter, and in particular, may be applied as a redundant sub-module in the MMC converter. In addition, the sub-modules 100 and 200 according to the present invention have a first terminal X1 and a second terminal X2 for connecting in series with other sub-modules and a third terminal X3 for connecting with an AC grid system, respectively. In this case, the switching operation of the sub-module and the redundant sub-module in the MMC converter varies according to whether the AC voltage is input through the third terminal X3, and the switching operation varies according to the charging of the capacitor or the bypass of the current.

Therefore, by applying the sub-modules 100 and 200 according to the present invention to the MMC converter and by appropriately controlling the switching operations of the plurality of power semiconductor switches constituting such a sub-module, it is efficient in terms of the MMC converter operation and effective in terms of the cost saving.

In the description above, although the components of the embodiments of the present disclosure may have been explained as assembled or operatively connected as a unit, the present disclosure is not intended to limit itself to such embodiments. Rather, within the objective scope of the present disclosure, the respective components may be selectively and operatively combined in any numbers. In addition, the terms "comprise", "include", or "have" described above mean that the corresponding component may be inherent unless otherwise stated, and thus it should be construed that it may further include other components, not to exclude other components. That is, terms like "include", "comprise", and "have" should be interpreted in default as inclusive or open rather than exclusive or closed unless expressly defined to the contrary. In the flowing description, unless otherwise defined, all terms including technical and scientific terms used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Although exemplary aspects of the present disclosure have been described for illustrative purposes, those skilled in the art will appreciate that various modifications, additions and substitutions are possible, without departing from essential characteristics of the disclosure. Therefore, the embodiments disclosed in the present invention are not intended to limit the technical idea of the present invention but to describe the present invention, and the scope of the technical idea of the present invention is not limited by these embodiments. The scope of protection of the present invention should be interpreted by the following claims, and all technical ideas within the scope equivalent thereto should be construed as being included in the scope of the present invention.

The invention claimed is:

1. A sub-module of an MMC converter, the sub-module comprising:
    a first power semiconductor switch and a second power semiconductor switch connected in series in a same direction, each comprising a semiconductor switch and a diode connected in anti-parallel to the respective semiconductor switch;
    a capacitor connected in parallel to the first power semiconductor switch and the second power semiconductor switch connected in series;
    a first terminal connected to a first node between the first and second power semiconductor switches;
    a second terminal connected to a second node between the second power semiconductor switch and the capacitor;
    a third power semiconductor switch of which one side is connected to the second node, the third power semiconductor switch comprising a semiconductor switch and a diode connected in anti-parallel to the semiconductor switch of the third power semiconductor switch; and
    a third terminal connected to a terminal of an AC grid system and connected to another side of the third power semiconductor switch.

2. The sub-module of claim 1, wherein a cathode of the diode included in the third power semiconductor switch is connected to the second node.

3. The sub-module of claim 1, wherein the first terminal is connected to one of two terminals of a sub-module connected to an upper end and the second terminal is connected to one of two terminals of a sub-module connected to a lower end.

4. A sub-module of an MMC converter, the sub-module comprising:
    a first power semiconductor switch and a second power semiconductor switch connected in series in a same direction, each comprising a semiconductor switch and a diode connected in anti-parallel to the respective semiconductor switch;

a capacitor connected in parallel to the first power semiconductor switch and the second power semiconductor switch connected in series;

a first terminal connected to a first node between the first and second power semiconductor switches;

a second terminal connected to a second node between the second power semiconductor switch and the capacitor;

a third power semiconductor switch of which one side is connected to the first node, the third power semiconductor switch comprising a semiconductor switch and a diode connected in anti-parallel to the semiconductor switch of the third power semiconductor switch; and a third terminal connected to a terminal of an AC grid system and connected to another side of the third power semiconductor switch.

5. The sub-module of claim 4, wherein a cathode of the diode included in the third power semiconductor switch is connected to the first node.

6. The sub-module of claim 4, wherein the first terminal is connected to one of two terminals of a sub-module connected to an upper end and the second terminal is connected to one of two terminals of a sub-module connected to a lower end.

7. A redundant sub-module of an MMC converter, the redundant sub-module comprising:

a first power semiconductor switch and a second power semiconductor switch connected in series in a same direction, each comprising a semiconductor switch and a diode connected in anti-parallel to the respective semiconductor switch;

a capacitor connected in parallel to the first power semiconductor switch and the second power semiconductor switch connected in series;

a first terminal connected to a first node between the first and second power semiconductor switches;

a second terminal connected to a second node between the second power semiconductor switch and the capacitor;

a third power semiconductor switch of which one side is connected to the second node, the third power semiconductor switch comprising a semiconductor switch and a diode connected in anti-parallel to the semiconductor switch of the third power semiconductor switch; and a third terminal connected to another side of the third power semiconductor switch and connected to a terminal of an AC grid system, wherein the redundant sub-module is connected between an upper converter arm and a lower converter arm respectively composed of a plurality of sub-modules connected in series to each other and is configured to be applicable in common to the upper converter arm and the lower converter arm of the MMC converter such that the redundant sub-module operates by replacing a sub-module in which a failure occurs among the plurality of sub-modules of the upper converter arm or the lower converter arm.

8. The MMC converter of claim 7, wherein a cathode of the diode included in the third power semiconductor switch is connected to the second node.

9. The redundant sub-module of claim 7, wherein the first terminal is connected to one of two terminals of a sub-module connected to an upper end of the redundant sub-module and the second terminal is connected to one of two terminals of a sub-module connected to a lower end of the redundant sub-module.

10. The redundant sub-module of claim 7, wherein when the redundant sub-module replaces a sub-module of the upper converter arm, the first and third power semiconductor switches are turned on and the second power semiconductor switch is turned off, so a current supplied through the first terminal flows through the first power semiconductor switch and the capacitor to the second terminal, and flows through the third power semiconductor switch to the third terminal to be supplied to the AC grid system.

11. The redundant sub-module of claim 7, wherein when the redundant sub-module replaces a sub-module of the lower converter arm, the first and third power semiconductor switches are turned on and the second power semiconductor switch is turned off, so a current supplied through the second terminal flows through the capacitor and the first power semiconductor switch to the first terminal, and flows through the third power semiconductor switch to the third terminal to be supplied to the AC grid system.

12. A redundant sub-module of an MMC converter, the redundant sub-module comprising:

a first power semiconductor switch and a second power semiconductor switch connected in series in a same direction, each comprising a semiconductor switch and a diode connected in anti-parallel to the respective semiconductor switch;

a capacitor connected in parallel to the first power semiconductor switch and the second power semiconductor switch connected in series;

a first terminal connected to a first node between the first and second power semiconductor switches;

a second terminal connected to a second node between the second power semiconductor switch and the capacitor;

a third power semiconductor switch of which one side is connected to the first node, the third power semiconductor switch comprising a semiconductor switch and a diode connected in anti-parallel to the semiconductor switch of the third power semiconductor switch; and a third terminal connected to a terminal of an AC grid system and connected to another side of the third power semiconductor switch, wherein the redundant sub-module is connected between an upper converter arm and a lower converter arm respectively composed of a plurality of sub-modules connected in series to each other and is configured to be applicable in common to the upper converter arm and the lower converter arm of the MMC converter such that the redundant sub-module operates by replacing a sub-module in which a failure occurs among the plurality of sub-modules of the upper converter arm or the lower converter arm.

13. The redundant sub-module of claim 12, wherein a cathode of the diode included in the third power semiconductor switch is connected to the first node.

14. The redundant sub-module of claim 12, wherein the first terminal is connected to one of two terminals of a sub-module connected to an upper end of the redundant sub-module and the second terminal is connected to one of two terminals of a sub-module connected to a lower end of the redundant sub-module.

15. The redundant sub-module of claim 12, wherein when the redundant sub-module replaces a sub-module of the upper converter arm, the first and third power semiconductor switches are turned on and the second power semiconductor switch is turned off, so a current supplied through the first terminal flows through the first power semiconductor switch and the capacitor to the second terminal, and flows through the third power semiconductor switch to the third terminal to be supplied to the AC grid system.

16. The redundant sub-module of claim 12, wherein when the redundant sub-module replaces a sub-module of the lower converter arm, the first and third power semiconductor switches are turned on and the second power semiconductor switch is turned off, so a current supplied through the second terminal flows through the capacitor and the first power semiconductor switch to the first terminal, and flows through the third power semiconductor switch to the third terminal to be supplied to the AC grid system.

17. An MMC converter, comprising:
an upper converter arm composed of a plurality of sub-modules connected in series to each other; and
a lower converter arm composed of a plurality of sub-modules connected in series to each other and connected in series to a sub-module of the upper converter arm, wherein each of the sub-modules comprises:
a first power semiconductor switch and a second power semiconductor switch connected in series in a same direction, each including a semiconductor switch and a diode connected in anti-parallel to the respective semiconductor switch;
a capacitor connected in parallel to the first power semiconductor switch and the second power semiconductor switch connected in series;
a first terminal connected to a first node between the first and second power semiconductor switches;
a second terminal connected to a second node between the second power semiconductor switch and the capacitor;
a third power semiconductor switch of which a side is connected to the second node, the third power semiconductor switch comprising a semiconductor switch and a diode connected in anti-parallel to the semiconductor switch of the third power semiconductor switch; and
a third terminal connected to a terminal of the AC grid system and connected to another side of the third power semiconductor switch.

18. The MMC converter of claim 17, wherein a cathode of the diode included in the third power semiconductor switch is connected to the second node.

19. The MMC converter of claim 17, wherein the first terminal is connected to one of two terminals of a sub-module connected to an upper end of the redundant sub-module and the second terminal is connected to one of two terminals of a sub-module connected to a lower end of the redundant sub-module.

20. An MMC converter, comprising:
an upper converter arm composed of a plurality of sub-modules connected in series to each other; and
a lower converter arm composed of a plurality of sub-modules connected in series to each other and connected in series to a sub-module of the upper converter arm, wherein each of the sub-modules comprises:
a first power semiconductor switch and a second power semiconductor switch connected in series in a same direction, each including a semiconductor switch and a diode connected in anti-parallel to the respective semiconductor switch;
a capacitor connected in parallel to the first power semiconductor switch and the second power semiconductor switch connected in series;
a first terminal connected to a first node between the first and second power semiconductor switches;
a second terminal connected to a second node between the second power semiconductor switch and the capacitor;
a third power semiconductor switch of which a side is connected to the first node, the third power semiconductor switch comprising a semiconductor switch and a diode connected in anti-parallel to the semiconductor switch of the third power semiconductor switch; and
a third terminal connected to a terminal of the AC grid system and connected to another side of the third power semiconductor switch.

21. The MMC converter of claim 20, wherein a cathode of the diode included in the third power semiconductor switch is connected to the first node.

22. The MMC converter of claim 20, wherein the first terminal is connected to one of two terminals of a sub-module connected to an upper end of the redundant sub-module and the second terminal is connected to one of two terminals of a sub-module connected to a lower end of the redundant sub-module.

23. An MMC converter comprising:
an upper converter arm composed of a plurality of sub-modules connected in series to each other;
a lower converter arm composed of a plurality of sub-modules connected in series to each other; and
at least one redundant sub-module connected in series between the upper and lower converter arms and commonly applicable to the upper and lower converter arms, wherein the redundant sub-module comprises:
a first power semiconductor switch and a second power semiconductor switch connected in series in a same direction, each including a semiconductor switch and a diode connected in anti-parallel to the respective semiconductor switch;
a capacitor connected in parallel to the first power semiconductor switch and the second power semiconductor switch connected in series;
a first terminal connected to a first node between the first and second power semiconductor switches;
a second terminal connected to a second node between the second power semiconductor switch and the capacitor;
a third power semiconductor switch of which a side is connected to the second node, the third power semiconductor switch including a semiconductor switch and a diode connected in anti-parallel to the semiconductor switch of the third power semiconductor switch; and
a third terminal connected to a terminal of an AC grid system and connected to another side of the third power semiconductor switch.

24. The MMC converter of claim 23, wherein a cathode of the diode included in the third power semiconductor switch is connected to the second node.

25. The MMC converter of claim 23, wherein the first terminal is connected to one of two terminals of a sub-module connected to an upper end of the redundant sub-module and the second terminal is connected to one of two terminals of a sub-module connected to a lower end of the redundant sub-module.

26. The MMC converter of claim 23, wherein when the redundant sub-module replaces a sub-module of the upper converter arm, the first and third power semiconductor switches are turned on and the second power semiconductor switch is turned off, so a current supplied through the first terminal flows through the first power semiconductor switch and the capacitor to the second terminal, and flows through the third power semiconductor switch to the third terminal to be supplied to the AC grid system.

27. The MMC converter of claim 23, wherein when the redundant sub-module replaces a sub-module of the lower converter arm, the first and third power semiconductor switches are turned on and the second power semiconductor switch is turned off, so a current supplied through the second terminal, flows through the capacitor and the first power semiconductor switch to the first terminal, and flows through the third power semiconductor switch to the third terminal to be supplied to the AC grid system.

28. An MMC converter, comprising:
an upper converter arm composed of a plurality of sub-modules connected in series to each other;
a lower converter arm composed of a plurality of sub-modules connected in series to each other; and
at least one redundant sub-module connected in series between the upper and lower converter arms and commonly applicable to the upper and lower converter arms, wherein the redundant sub-module comprises:
a first power semiconductor switch and a second power semiconductor switch connected in series in a same direction, each including a semiconductor switch and a diode connected in anti-parallel to the respective semiconductor switch;
a capacitor connected in parallel to the first power semiconductor switch and the second power semiconductor switch connected in series;
a first terminal connected to a first node between the first and second power semiconductor switches;
a second terminal connected to a second node between the second power semiconductor switch and the capacitor;
a third power semiconductor switch of which a side is connected to the first node, the third power semiconductor switch including a semiconductor switch and a diode connected in anti-parallel to the semiconductor switch of the third power semiconductor switch; and
a third terminal connected to a terminal of an AC grid system and connected to another side of the third power semiconductor switch.

29. The MMC converter of claim 28, wherein a cathode of the diode included in the third power semiconductor switch is connected to the first node.

30. The MMC converter of claim 28, wherein the first terminal is connected to one of two terminals of a sub-module connected to an upper end of the redundant sub-module and the second terminal is connected to one of two terminals of a sub-module connected to a lower end of the redundant sub-module.

31. The MMC converter of claim 28, wherein when the redundant sub-module replaces a sub-module of the upper converter arm, the first and third power semiconductor switches are turned on and the second power semiconductor switch is turned off, so a current supplied through the first terminal flows through the first power semiconductor switch and the capacitor to the second terminal, and flows through the third power semiconductor switch to the third terminal to be supplied to the AC grid system.

32. The MMC converter of claim 28, wherein when the redundant sub-module replaces a sub-module of the lower converter arm, the first and third power semiconductor switches are turned on and the second power semiconductor switch is turned off, so a current supplied through the second terminal, flows through the capacitor and the first power semiconductor switch to the first terminal, and flows through the third power semiconductor switch to the third terminal to be supplied to the AC grid system.

* * * * *